United States Patent

[11] 3,604,843

[72] Inventors Leopold Albert Harwood
Somerville;
Erwin Johann Wittmann, N. Plainfield,
both of N.J.

[21] Appl. No. 822,887
[22] Filed May 8, 1969
[45] Patented Sept. 14, 1971
[73] Assignee RCA Corporation

[54] AMPLIFIER CIRCUITS
10 Claims, 1 Drawing Fig.

[52] U.S. Cl. .......... 178/5.4 R, 330/19, 330/20, 330/147, 330/148, 178/69.5 CB
[51] Int. Cl. .......... H04n 9/12
[50] Field of Search .......... 330/19, 20, 84, 126, 147, 148, 184; 178/5.4 R, 6, 69.5 CB

[56] References Cited

UNITED STATES PATENTS

| | | | |
|---|---|---|---|
| 2,847,519 | 8/1958 | Aronson | 330/20 |
| 2,860,195 | 11/1958 | Stanley | 330/20 |
| 2,968,767 | 1/1961 | White | 178/5.4 |
| 3,369,187 | 2/1968 | Csicsatka | 330/19 |

*Primary Examiner*—Richard Murray
*Assistant Examiner*—P. M. Pecori
*Attorney*—Eugene M. Whitacre

ABSTRACT: An amplifier comprises first and second transistors. A voltage divider is coupled between the base electrode of the first transistor and a point of reference potential. The base electrode of the second transistor is also coupled to an intermediate point on the voltage divider. A degenerating resistor coupled between the emitters is selected to provide a DC voltage drop thereacross equal to the DC drop between the base electrodes. A common current return path coupled to the emitter of the second transistor biases both transistors linearly with said voltage divider while the degenerating resistor also serves as a negative feedback element for signals applied to the base electrode of the first transistor.

The bias scheme enables both transistors to operate linearly, as stably biased, while exhibiting different gain factors for signals applied to their respective base electrodes.

PATENTED SEP 14 1971 3,604,843
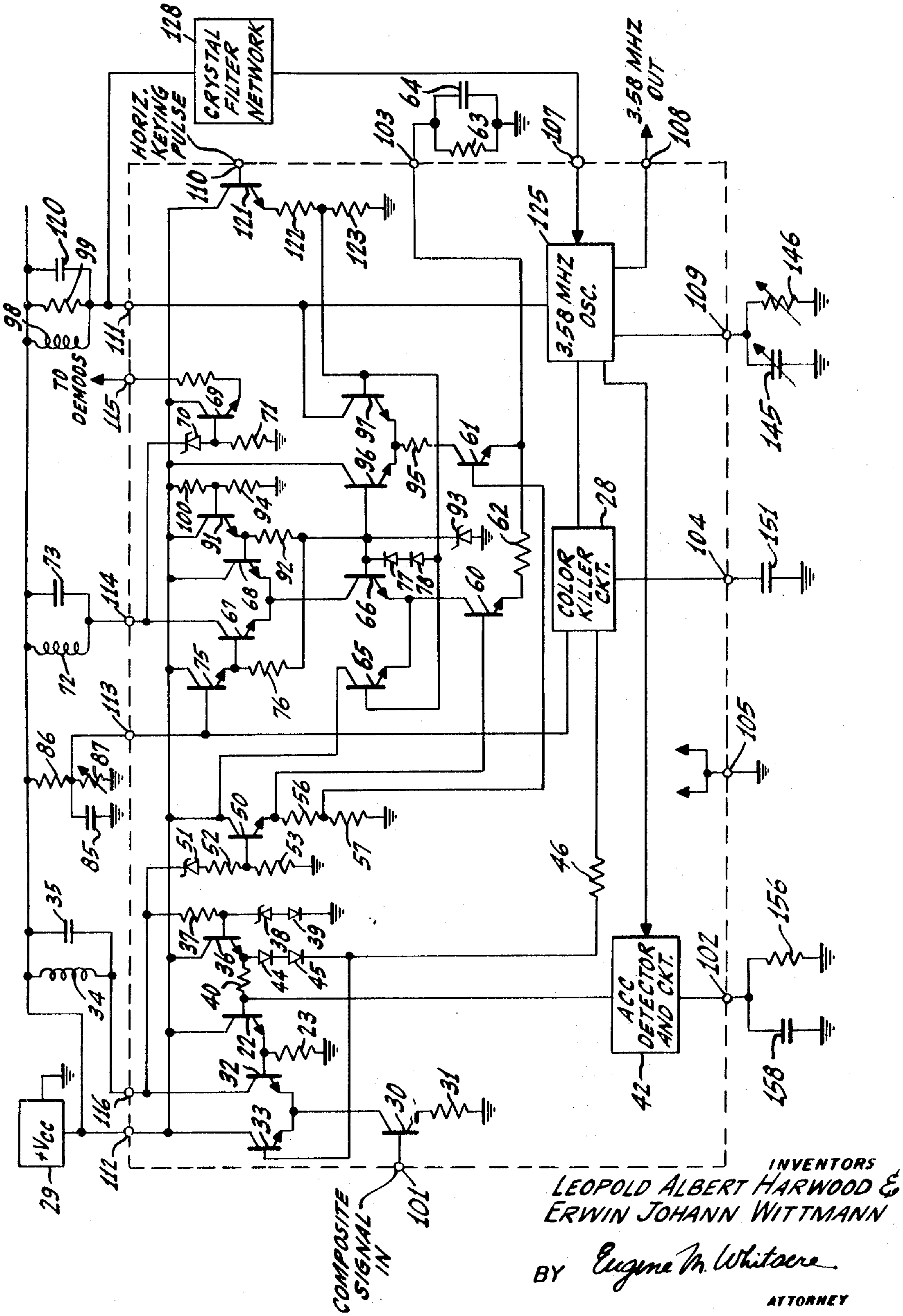
INVENTORS
LEOPOLD ALBERT HARWOOD & ERWIN JOHANN WITTMANN
BY Eugene M. Whitacre
ATTORNEY

AMPLIFIER CIRCUITS

This invention relates to amplifier circuits and, more particularly, to such circuits for use in a color television receiver, and especially adaptable for use with integrated circuit techniques.

A color television receiver includes amplifying circuitry for selectively responding to the chrominance subcarrier frequency signals transmitted with a composite signal during a color transmission. The chrominance subcarrier signal components contain amplitude information pertinent to the saturation of the requisite colors forming the display; and phase information pertinent to the hue of such colors.

In the United States the NTSC system as utilized at the transmitter generates such chrominance subcarrier components by a suppressed carrier modulation technique. An oscillatory burst signal is also transmitted along with the composite signal and used in the receiver for synchronizing a local oscillator. The oscillator signals are useful for properly demodulating such chrominance subcarrier components. Due to the standards specified in the present color system the amplitude of the chrominance signals may exceed the amplitude of the burst signal, which is desirably transmitted at a relatively constant level. Therefore the respective amplifying circuits for these signals must be designed to accommodate such anticipated variations.

Using prior art techniques, one may employ a separate chrominance amplifier biased at a quiescent level enabling it to accommodate the anticipated amplitude variations in the chrominance subcarrier signal components. In a similar manner a separate burst amplifier may also be provided which is biased to enable it to accommodate the burst signal with a predetermined amount of amplification.

However, in the integrated circuit environment one does not have the flexibility associated with discrete component technology. In view of prior art approaches, one would bias the chroma amplifier stage from a separate network isolated from still another separate biasing network for the burst amplifier stage. Accordingly, both stages, as biased, would be AC coupled to the source of composite signals and will exhibit different gain characteristics, determined by the biasing network and other feedback arrangements, to operate reliably in accordance with the above described signal variations.

However, in the integrated circuit environment, AC coupling is more difficult to implement than DC coupling. Separate biasing schemes may dictate the use of separate terminals for the burst and chrominance amplifiers. The conservation of terminals in the integrated circuit environment is a prime consideration as present techniques can only accommodate a given number of terminals for a given size chip.

It is therefore an object of the present invention to provide an improved chrominance amplifier for use in a color television receiver.

A further object of the present invention is to provide an improved chrominance amplifier circuit configuration for accommodating the anticipated variations in burst and chrominance subcarrier signal level.

Still a further object is to provide an improved chrominance amplifier particularly adaptable for use with integrated circuit techniques employing a single input and output terminal, while further providing a reliable biasing scheme.

According to an embodiment of the present invention, first and second transistors comprise the amplifier circuit. A voltage divider is coupled between the base electrode of the first transistor and a point of reference potential. A point on the voltage divider is also coupled to the base electrode of the second transistor. A common current return path for the first and second transistors is provided by coupling the emitter electrode of the second transistor to a resistor bypassed for AC by a capacitor. A third resistor coupled between the emitter electrodes of the first and second transistors is selected to have a magnitude sufficient to provide a DC voltage drop thereacross equal to the DC voltage drop between the base electrode of the first transistor and the base electrode of the second transistor, to provide with said common return path emitter network a common, linear DC biasing quiescent point for both transistors. The resistor coupled between the emitter electrodes serves to provide current degeneration for the first transistor enabling it to operate linearly, for example, with anticipated variations in the chrominance subcarrier components, while the second transistor has no emitter degeneration and operates at a higher gain level for the smaller amplitude burst signal.

These and other objects of the present invention will be made clearer if reference is made to the accompanying specification taken in conjunction with the accompanying FIGURE, which is a schematic diagram partially in block form of a chrominance processing integrated circuit chip employing an amplifier configuration according to this invention.

Referring to the FIGURE there is shown a schematic diagram partially in block form of an integrated circuit configuration capable of performing chrominance processing and including a chrominance amplifier configuration according to this invention.

A composite television signal is applied to terminal 101 coupled to the base electrode of a first chrominance amplifier stage including a transistor 30 having its emitter electrode returned to ground through a resistor 31. Transistor 30 forms part of a totem pole or cascode amplifier further comprising a transistor 32 having the emitter electrode coupled to the collector electrode of transistor 30. The collector electrode of transistor 32 is coupled to terminal 116 on the integrated circuit substrate.

A parallel resonant tank circuit comprising inductor 34 and capacitor 35 is coupled between terminal 116 and a source of operating potential 29 designated as $+V_{cc}$ and also coupled to the terminal 112 for supplying operating potential to the entire integrated circuit assembly. The parallel resonant tank circuit has a frequency band-pass characteristic within the chrominance subcarrier frequency range and serves to provide bandwidth selection for the amplifier. A biasing scheme for the cascode amplifier is referenced from a follower transistor 36 having the base electrode coupled to a voltage reference source comprising resistor 37 in series with a reference diode or zener diode 38 and a semiconductor diode 39 utilized for temperature stability. The junction between resistor 37 and the zener diode 38 is coupled to the base electrode of the follower transistor 36. The emitter electrode of the follower transistor 36 is coupled to the base electrode of a bias follower transistor 22 through a resistor 40.

Transistor 22 has the emitter electrode coupled to the base electrode of transistor 32 for providing operating bias thereto, and has an emitter shunt resistor 23 coupled to a point of reference potential such as ground. Transistor 32 is further current controlled and gain controlled by means of transistor 33 arranged in a follower configuration and having the emitter electrode connected directly to the emitter electrode of transistor 32. The base electrode of transistor 33 is referenced back to the emitter electrode of transistor 36 through the series diodes 44 and 45. The diodes 44 and 45 are maintained in forward conduction during a color transmission by means of a resistor 46 coupled between a color killer circuit 28 and the junction between the diodes and the base electrode of transistor 33. An ACC control voltage is applied between the junction of the base electrode of transistor 22 and resistor 40 by means of the ACC detector 42. The nature and operation of the ACC detector, as effecting gain control, of the above-described totem pole configuration is more fully described in a copending application by L. A. Harwood entitled "AUTOMATIC CHROMA CONTROL CIRCUITRY" Ser. No. 822,951 filed concurrently herewith on May 8, 1969, and assigned to the same assignee.

The amplified chrominance signal appearing at terminal 116 is applied to the input or base electrode of transistor 50 via a zener diode 51 in series with a resistor 52. A resistor 53 is coupled between the base electrode of transistor 50 and ground and serves as a biasing element for transistor 50.

Transistor 50, arranged in emitter follower configuration, has a collector electrode coupled to terminal 112 (+$V_{cc}$) and has an emitter electrode returned to ground through the series load comprising resistors 56 and 57.

Transistor 50 provides chroma drive and burst drive to a chrominance amplifier transistor 60 and a burst amplifier transistor 61. The base electrode of transistor 60 is coupled to the junction between emitter electrode of transistor 50 and resistor 56, and the base electrode of transistor 61 is coupled to the junction between resistors 56 and 57. The emitter electrode of transistor 60 is coupled to the emitter electrode of transistor 61 via a chrominance degenerating resistor 62. The junction between resistor 62 and the emitter electrode of transistor 61 is coupled to a terminal 103 on the integrated circuit assembly.

A parallel RC network comprising a resistor 63 and a capacitor 64 is externally connected between terminal 103 and ground.

As will be described subsequently, the configuration comprising transistors 50, 60 and 61 offers many advantages for optimum amplification of burst signals and chrominance subcarrier components.

The chrominance amplifier transistor 60 has a collector electrode coupled to the junction between the emitter electrode of transistors 65 and 66 forming part of a switchable differential amplifier stage. The collector electrode of transistor 66 is coupled to the junction between the emitter electrode of transistors 67 and 68 also arranged in a differential amplifier configuration. Transistor 68 has the collector electrode coupled to terminal 112. Transistor 67 has the collector electrode coupled to the base electrode of a follower transistor 69 via a zener diode 70. A resistor 71 coupled to the base electrode of transistor 69 completes the bias and drive circuit. The junction between the collector electrode of transistor 67 and the cathode of the zener diode 70 is coupled to terminal 114. A parallel resonant circuit comprising inductor 72 and capacitor 73 is externally connected between the integrated circuit assembly at terminal 114 and the +$V_{cc}$ supply. This selective network is responsive to chrominance frequencies and functions to provide further selectivity of the chrominance signals as applied to the base electrode of transistor 60. A controllable biasing network for transistor 67 employs a follower transistor 75 having the emitter electrode coupled to the base electrode of transistor 67. Bias for transistor 66 is also obtained by coupling the emitter electrode of transistor 75 to the base electrode of transistor 66 via resistor 76. The base electrode of transistor 65 is coupled to the base electrode of transistor 66 through the series combination of diodes 77 and 78. The base electrode of the follower transistor 75 is coupled to terminal 113 to which an external voltage divider comprising resistors 86 and 87 is also coupled. Resistors 86 and 87 are selected to provide temperature tracking with the voltage divider comprising the on-chip resistors 94 and 100 and used for biasing the base electrode of the bias follower transistor 91. A capacitor 85 is connected between terminal 113 and a point of reference potential and serves as a decoupling element. A ground return path for the base electrode of transistor 75 is provided through a controllable impedance associated with the color killer circuit 28. A more detailed description of the bias control may be obtained by reference to a copending application entitled "OSCILLATOR CIRCUITS" Ser. No. 823,066 by L. A. Harwood filed concurrently herewith on May 8, 1969, and assigned to the same assignee.

Reference biasing for transistor 68 is supplied by the follower biasing transistor 91 having the emitter electrode directly coupled to the base electrode of transistor 63. A resistor 92 is coupled between the emitter electrode of transistor 91 and the base electrode of transistor 66. A reference potential for the base electrode of transistor 66 is supplied by zener diode 93 coupled between the base electrode and a point of reference potential. The above-mentioned stages including transistor 60 and the switchable differential amplifier serve to provide chrominance amplification as will be described subsequently.

The burst amplification path includes the burst driver amplifier 61 having the collector electrode thereof coupled through a current limiting resistor 95 to the junction between the emitter electrodes of a differential amplifier arrangement comprising transistors 96 and 97. The base electrode of the follower transistor 96 receives an operating bias from the connection thereto of the cathode of the aforementioned zener diode 93. Transistor 97 has the collector electrode coupled to terminal 111 on the integrated circuit chip. An external parallel resonant circuit comprises inductor 98, resistor 99 and capacitor 120 and is selected to provide a fairly broad frequency response about 3 MHz. and is coupled between terminal 111 and the +$V_{cc}$ supply. The resonant circuit is used as part of the burst separator for burst selectivity, and for further specifying the frequency and phase characteristics determinative of the locking ability of the chroma subcarrier oscillator 125.

The oscillator 125 is an injection locked type and utilizes a crystal filter network 128 externally connected between terminal 111 and an oscillator input terminal 107, for providing AC feedback and for burst injection.

The oscillator 125 includes a limiter stage which operates with the network coupled to terminal 109 comprising capacitor 145 and resistor 146, to provide average detection for the color killer circuit 28, while further providing ACC and killer threshold adjustments.

The ACC detector 42, controls the gain of the chrominance amplifier including transistors 30 and 32, according to peak variations of the oscillator signal amplitude. A time constant for ACC is provided by the capacitor 157 and resistor 156 coupled to terminal 102.

The color killer circuit 28 has a killer time constant determined by capacitor 151 coupled to terminal 104. The color killer circuit 28 serves to disable the chrominance amplifier including transistors 67 and 68 during a monochrome transmission. The exact nature and operating characteristics of the oscillator circuit 125 and the color killer and ACC circuits are more fully described in the above noted concurrently filed copending applications entitled "OSCILLATOR CIRCUITS" and "AUTOMATIC CHROMA CONTROL CIRCUITS."

A keyed transistor 121 has a collector electrode coupled to the +$V_{cc}$ bus (terminal 112) and an emitter electrode returned to ground through the series combination of resistors 122 and 123. The junction between resistor 122 and resistor 123 is coupled respectively to the base electrodes of transistors 65 and 97. The base electrode of transistor 121 is coupled to terminal 110 of the integrated circuit chip. In operation a horizontal keying pulse of a positive polarity is applied to terminal 110 as will be described subsequently.

The operation of the integrated circuit assembly containing the above-described components connected in the above-described configuration will now be explained in greater detail.

The composite signal as applied to terminal 101 is amplified by the cascode combination of transistors 30 and 32 and is confined to a predetermined bandwidth at terminal 116 due to the "Q" of the resonant circuit comprising inductor 34 and capacitor 35. The amplified signal is applied to the base electrode of transistor 50 via the zener diode 51 and resistor 52. The avalanche or the zener diode 51 together with resistors 52 and 53 serves to maintain a relatively constant DC bias for transistor 50 as described in greater detail in the above-noted copending application entitled "AUTOMATIC CHROMA CONTROL CIRCUITS."

Transistor 50 thus biased is arranged in an emitter follower configuration having a split emitter load for driving the chrominance amplifier stage 60 and a burst amplifier stage 61. As can be seen, the magnitude of the signal applied to the base electrode of the chrominance amplifier 60 is slightly greater than the magnitude applied to the base electrode of the burst amplifier 61. This is so as the base electrode of the chrominance amplifier 60 is coupled directly to the junction between the emitter electrode of transistor 50 and resistor 56, while the base electrode of transistor 61 is coupled to the junction between resistors 56 and 57. The arrangement shown according to this invention offers the following advantages and operates as follows.

The standards for a color television transmission are such that the amplitude of the chrominance signal may exceed the amplitude of the burst signal. The respective chrominance and burst amplifiers must be capable of handling the maximum levels of the particular signal assigned thereto without distortion. This capability is provided for as follows.

The DC voltage drop across the emitter resistor 62 in series with the emitter electrode of the chrominance amplifier 60 is approximately equal to the DC voltage drop across the resistor 56 in the emitter electrode of transistor 50. Resistor 62 affords negative current feedback for the chrominance amplifier 60, while both stages 60 and 61 have a common return path through terminal 103 and resistor 63 to ground.

The DC voltage at terminal 103 is relatively constant as bypassed by capacitor 64. However, the base electrode of transistor 61 is DC coupled to lower potential point than is the base electrode of transistor 60. Both stages are biased at a DC level to provide linear operation while further having only one external output connection (terminal 103). Therefore amplifiers 60 and 61 have a common input terminal across resistor 56 and a common path for emitter current resulting in a common output terminal 103.

The DC biasing advantages are available with the additional fact that the degree of signal degeneration in the chroma stage can be set independent of the gain of the burst amplifier, while further maintaining both stages at a relatively constant DC bias. Due to the emitter degeneration afforded by resistor 62 the chrominance amplifier 60 can handle larger amplitude conditions of the chrominance signals without distortion.

Transistor 61 can handle the lower amplitude burst signal at a higher gain level without distorting the burst signal available at the back porch of the horizontal synchronizing pulse. Furthermore with the simple biasing arrangement shown, the chrominance amplifier 60 operates linearly for chrominance signals at their anticipated levels while the burst amplifier, as biased, would distort such signals because of the lack of degeneration, but will operate linearly with the lower amplitude burst signal. The distortion which the amplifier 61 may introduce to higher level chrominance signals, during the horizontal line interval, will not couple back and effect or distort the chrominance output because of the isolation provided between the driving circuits for amplifiers 60 and 61 due to resistor 56.

As is known in the prior art, it is preferable to blank the chroma channel during the burst period to prevent spurious products from being developed by the demodulators because of the coupling thereto of the burst signal. The technique is normally referred to as burst elimination or burst blanking. The chrominance amplifier is preferably energized during the major portion of the line interval and is blanked during burst retrieval occurring during the horizontal retrace interval. To accomplish this, a horizontal retrace pulse is utilized during a horizontal interval encompassing the time in which burst is present on the back porch during the horizontal synchronizing pulse.

A positive polarity horizontal pulse is applied to the base electrode of transistor 121 causing the following operations to occur.

The emitter of transistor 121 goes positive during the pulse, thus turning on transistor 97 permitting the burst signal as applied to the base electrode of transistor 61, to be selectively amplified by transistors 61 and 97 in conjunction with the collector load comprising the parallel resonant circuit of inductor 98, capacitor 120 and the damping resistor 99. Hence during the positive pulse the amplified burst appears at terminal 111. The tank circuit further serves to remove signal components at the horizontal retrace pulse frequencies from affecting the burst output. Similarly, during the burst interval the base electrode of transistor 65 which is coupled to the emitter electrode of transistor 121 also goes positive.

The base potential of transistor 65 exceeds the base potential of transistor 66 by at least $2V_{be}$ due to the drops across diodes 77 and 78. The diodes 77 and 78 also limit the amplitude of the keying pulse at the base of transistor 97 to limit the collector swing. The emitter electrode of transistor 65 follows the base and hence goes positive. Transistor 66 is cut off cue to the positive rise in the emitter voltage as the emitter electrode is at least $1V_{be}$ above the base electrode. This disabling of transistor 66 disables the chroma path and hence there is no signal that can be applied to terminal 114, which is the chrominance output terminal, during the burst interval. The operation of the circuit during the line scan is as follows.

The absence of the horizontal retrace pulse causes transistor 121 to be nonconducting which effectively applies ground potential to the base electrode of transistor 97. Transistor 97 is therefore cut off due to the positive potential at the emitter electrode determined by the conduction of transistor 96 which is biased on, via transistor 91, resistor 92 and the zener diode 93. In this manner there is no amplification path to terminal 111 for any chrominance signals applied to the base electrode of the burst amplifier transistor 61. In a similar manner transistor 65 is also cut off as having its base electrode effectively at ground while its emitter electrode is at a positive potential due to the conduction of transistor 66 biased in a similar manner as described for transistor 96. Chrominance signals as applied to the base electrode of transistor 60 are amplified by transistors 60 and 66 and drive the common emitter connection of transistors 67 and 68. This action enables the chrominance signal to be effectively amplified at terminal 114 and hence coupled to the base electrode of transistor 69 via the zener diode 70. Amplified chrominance signals are thereby available for application to appropriate demodulating circuitry, not shown, at terminal 115 which is coupled to the emitter electrode of transistor 69.

What is claimed is:

1. An amplifier circuit comprising, a. first and second transistors of the same conductivity each having a base, collector and emitter electrode, b. a resistive voltage divider coupled between the base electrode of said first transistor and a point of reference potential, and further including a DC coupling path between another point on said voltage divider and the base electrode of said second transistor, c. means coupled between the emitter electrode of said second transistor and a point of reference potential for providing a current return path, d. means coupled to said collector electrodes of said first and second transistors and said voltage divider for applying an operating potential thereto, and e. a resistor coupling said emitter electrode of said first transistor to said emitter electrode of said second transistor, said resistor providing a DC voltage thereacross equal to the DC voltage drop between said base electrode of said first transistor and said other point on said voltage divider in accordance with the application of said operating potential, whereby said bias on said first transistor is substantially equal to said bias on said second transistor.

2. An amplifier circuit comprising, a. first and second transistors of the same conductivity each having a base, collector and emitter electrode, b. a voltage divider including first and second series resistors coupled between the base electrode of said first transistor and a point of reference potential, and further including a DC coupling path between the junction of said first and second resistors and the base electrode of said second transistor, c. means coupled between said emitter electrode of said second transistor and a point of reference potential for providing a current return path, d. means coupled to said collector electrode of said first and second transistors and said voltage divider for applying an operating potential thereto, and e. a third resistor coupling said emitter electrode of said first transistor to said emitter electrode of said second transistor, said third resistor provide a DC voltage thereacross substantially equal to the DC voltage across said first resistor in accordance with the application of said operating potential.

3. An amplifier circuit, comprising, a. a first transistor having a base, collector and emitter output electrode arranged in an emitter follower configuration, b. first and second resistors in a series path between said emitter output electrode and a point of reference potential, c. second and third transistors of the same conductivity, each having a base, collector and emitter electrode, said base electrode of said second transistor coupled to said emitter output electrode of said first transistor and said base electrode of said third transistor coupled between the junction of said first and second resistors, d. a third resistor coupled between the emitter electrodes of said second and third transistors, said third resistor being of a magnitude to provide a DC voltage drop thereacross substantially equal to any DC voltage drop across said first resistor, e. means coupled to the emitter electrode of said third transistor for providing a ground return path for said second and third transistors for all current flowing through the collector to emitter path of said second and third transistors.

4. A circuit arrangement for amplifying signals comprising, a. a first amplifier having an input and output terminal, said amplifier including means for applying signals to said input terminal, b. first means coupled to said output terminal of said amplifier for providing a load impedance for DC and signal currents, c. a second amplifier having an input, output and common terminal, a direct coupling path between said input terminal of said second amplifier and said output terminal of said first amplifier, d. a third amplifier having an input, output and common terminal, said input terminal of said third amplifier direct coupled to a point on said first means, e. a resistive impedance coupled between the output terminals of said second and third amplifiers, said resistive impedance providing a DC voltage drop thereacross substantially equal to any DC voltage difference between said input terminals of said second and third amplifiers, as coupled to said load impedance means, f. second means including another resistor coupling said output terminal of said third amplifier to said common terminal, said second means operating to bypass all current flowing in said second and third amplifiers due to any DC and signal components flowing therethrough to said common terminal, said means as coupled, further causing any voltage due to signal current components developed across said resistive impedance to provide degeneration for signals applied to said input electrode of said second amplifier, while further serving, with said first means, to maintain the biasing of said second and third amplifiers relatively equal.

5. An amplifier circuit for use in a color television receiver of the type employing chrominance processing circuitry for selectively amplifying chrominance subcarrier signal frequencies including an oscillatory burst signal transmitted with a composite television signal during a color transmission, comprising:

a. first, second and third terminals, b. a resistive divider coupled between said first terminal and said third terminal, c. a first and second transistor of the same conductivity each having a base, collector and emitter electrode, a first direct coupling path between said first terminal and said base electrode of said first transistor, and a second direct coupling path between a point on said resistive divider and said base electrode of said second transistor, a third direct coupling path between said emitter electrode of said second transistor and said second terminal, d. a resistor coupling said emitter electrode of said first transistor to said second terminal, said resistor selected in accordance with the magnitude of the resistance appearing between said first terminal and the base electrode of said second transistor, for developing a DC potential thereacross equal to any DC potential difference between said first terminal and said base electrode of said second transistor, and e. means, coupled between said second and third terminals for providing a current return path for all currents both AC and DC which flow through the collector to emitter paths of said first and second transistors, whereby said first and second transistors are biased at relatively the same DC level, f. means coupled between said first and third terminals for applying said chrominance subcarrier signal frequencies including said oscillatory burst signal thereto, to cause said first transistor to linearly operate, as biased, with a given gain for said chrominance subcarrier signal frequencies, and said second amplifier, as biased, to operate linearly for said burst signal with a larger gain than said given gain.

6. The amplifier circuit according to claim 5 further comprising, a. means, including a first selective network, coupled to the collector electrode of said first transistor for providing further selectivity to said chrominance subcarrier frequency signals as applied between said first and third terminals.

7. The amplifier circuit according to claim 5 further comprising, a. means, including a second selective, network coupled to the collector electrode of said second transistor for providing frequency selectivity to said oscillatory burst signal as oscillatory burst signal as linearly amplified by said second transistor.

8. The amplifier according to claim 5 further comprising, a. a first switchable differential amplifier including third and fourth transistors having their emitter electrodes coupled to said collector electrode of said first transistor, b. means including a first selective network coupled to said collector electrode of said fourth transistor for providing further selectivity to said chrominance subcarrier frequency signals as applied between said first and third terminals, c. a second switchable differential amplifier including fifth and sixth transistors having their emitter electrodes coupled to said collector electrode of said second transistor, d. means, including a second selective network coupled to the collector electrode of said sixth transistor for providing frequency selectivity to said oscillatory burst signal as linearly amplified by said second transistor e. a common biasing network coupled to the base electrodes of said fourth and fifth transistors for supplying operating bias to said first and second switchable differential amplifiers, f. means coupled to the base electrodes of said third and sixth transistors for alternatively switching between said first and second differential amplifiers according to the period of said oscillatory burst signal, to cause said fourth transistor of said first differential amplifier to be switched off and said fifth transistor of said second differential amplifier to be switched on during the presence of said burst signal.

9. An amplifier for use in a color television receiver of the type employing chrominance processing circuitry for selectively amplifying chrominance subcarrier signal frequencies including an oscillatory burst signal transmitted with a composite television signal during a color transmission, comprising, a. a monolithic circuit chip having an array of chip terminals incorporating, b. a follower transistor amplifier configuration including a direct coupling path between the base electrode thereof and said chrominance processing amplifier, said follower amplifier including a resistive impedance load connected in series between said emitter electrode and a point of reference potential, c. a second transistor amplifier, including a direct coupling path between the base electrode of said second transistor and the emitter electrode of said follower transistor, d. a third transistor amplifier including a direct coupling path between the base electrode thereof and a point of said resistive load connected in series with the emitter electrode of said follower transistor, a DC coupling path between the emitter electrode of said third transistor and one of said chip terminals, e. a resistor coupling said emitter electrode of said first transistor to said one chip terminal, said resistor being of a magnitude to provide a DC voltage thereacross equal to the DC voltage difference between said emitter electrode of said follower transistor and said point on said resistive load, and f. an off-chip network, including a shunt resistor and capacitor, coupled between said chip terminal and a point of reference potential for providing a common current return path for said second and third transistor amplifiers for both DC and signal components flowing therethrough, for operating with said resistor to bias said second transistor amplifier in a linear region for chrominance subcarrier signal frequencies and for operating to bias said third transistor in a linear region for said oscillatory burst signal.

10. The amplifier according to claim 1, further comprising:

a. means for applying signals to said base electrodes of said first and second transistors to cause said resistor to degenerate said signals as applied to the base electrode of said first transistor and to therefore operate said first transistor at a lower gain than said second transistors.

UNITED STATES PATENT OFFICE
CERTIFICATE OF CORRECTION

Patent No. 3,604,843 Dated September 14, 1971

Inventor(s) Leopold Albert Harwood et al.

It is certified that error appears in the above-identified patent and that said Letters Patent are hereby corrected as shown below:

Column 3, line 67, that portion reading "transistor 63" should read -- transistor 68 --.

Column 6, line 7, that portion reading "cue" should read -- due --.

Column 7, line 3, that portion reading "provide" should read -- providing --.

Column 8, line 41, after "signal" (first occurrence) and before "as linearly" delete "as oscillatory burst signal".

Signed and sealed this 14th day of March 1972.

(SEAL)
Attest:

EDWARD M.FLETCHER,JR.
Attesting Officer

ROBERT GOTTSCHALK
Commissioner of Patents